United States Patent
Sano (10) Patent No.: US 9,759,257 B2
(45) Date of Patent: Sep. 12, 2017

(54) BEARING AND BEARING PAD

(71) Applicant: MITSUBISHI HEAVY INDUSTRIES, LTD., Tokyo (JP)

(72) Inventor: Takeshi Sano, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 0 days.

(21) Appl. No.: 14/392,311

(22) PCT Filed: Feb. 12, 2015

(86) PCT No.: PCT/JP2015/053805
§ 371 (c)(1),
(2) Date: Dec. 24, 2015

(87) PCT Pub. No.: WO2016/047159
PCT Pub. Date: Mar. 31, 2016

(65) Prior Publication Data
US 2016/0265590 A1    Sep. 15, 2016

(30) Foreign Application Priority Data

Sep. 22, 2014  (JP) .................................. 2014-192545

(51) Int. Cl.
*F16C 33/10* (2006.01)
*F16C 17/10* (2006.01)
(Continued)

(52) U.S. Cl.
CPC ............ *F16C 33/108* (2013.01); *F16C 17/03* (2013.01); *F16C 17/06* (2013.01); *F16C 17/10* (2013.01);
(Continued)

(58) Field of Classification Search
CPC .......... F16C 17/03; F16C 37/00; F16C 37/02; F16C 32/0666; F16C 33/108;
(Continued)

(56) References Cited

U.S. PATENT DOCUMENTS 2,363,260 A    11/1944  Peskin
3,004,804 A *  10/1961  Pinkus .................... F16C 17/03
                                                          384/311
(Continued)

FOREIGN PATENT DOCUMENTS

JP    2001-200847    7/2001
JP    2009-63015     3/2009
JP    2010-151292    7/2010

OTHER PUBLICATIONS

International Search Report issued Mar. 31, 2015 in corresponding International Application No. PCT/JP2015/053805.
(Continued)

*Primary Examiner* — Alan B Waits
(74) *Attorney, Agent, or Firm* — Wenderoth, Lind & Ponack, L.L.P.

(57) ABSTRACT

A bearing pad and bearing are provided which can inhibit the bearing pad from being deformed without increasing the costs. In a bearing pad (2), a conduit that extends from a first opening (3a) formed in a high temperature zone (2H) on a sliding surface (2a) opposing to a supported surface (1a) towards the direction apart from the supported surface (1a) and that finally reaches a second opening (3d) is formed.

17 Claims, 6 Drawing Sheets

(51) Int. Cl.
*F16C 37/00* (2006.01)
*F16C 17/03* (2006.01)
*F16C 17/06* (2006.01)

(52) U.S. Cl.
CPC ...... *F16C 33/1065* (2013.01); *F16C 33/1085* (2013.01); *F16C 37/00* (2013.01); *F16C 37/002* (2013.01)

(58) Field of Classification Search
CPC .. F16C 33/1065; F16C 33/1085; F16C 17/10; F16C 17/06
See application file for complete search history.

(56) References Cited

U.S. PATENT DOCUMENTS

| | | | | |
|---|---|---|---|---|
| 3,339,990 A * | 9/1967 | Wendt | ............... | F16C 17/03 384/311 |
| 3,454,312 A * | 7/1969 | Bielec | ............... | F16C 17/06 384/307 |
| 3,887,249 A * | 6/1975 | Rouch | ............... | F16C 17/03 384/310 |
| 3,893,737 A * | 7/1975 | Tyson | ............... | F16C 17/06 384/307 |
| 3,944,304 A * | 3/1976 | Purtschert | ............... | F16C 33/108 384/117 |
| 4,023,866 A * | 5/1977 | Gutierrez Atencio | | F03B 11/066 384/319 |
| 4,322,116 A * | 3/1982 | Heinemann | ............... | F16C 13/04 384/100 |
| 4,413,864 A * | 11/1983 | Phillips | ............... | F16C 29/025 384/12 |
| 6,200,034 B1 * | 3/2001 | Miller | ............... | F16C 17/03 384/117 |
| 6,485,182 B2 * | 11/2002 | Nicholas | ............... | F16C 17/03 384/117 |
| 6,499,883 B2 * | 12/2002 | Miller | ............... | F16C 33/108 384/117 |
| 6,588,933 B2 * | 7/2003 | Ferguson | ............... | F16C 17/04 384/122 |
| 6,739,756 B2 * | 5/2004 | Miller | ............... | F16C 17/03 384/117 |
| 7,758,247 B2 * | 7/2010 | Geiger | ............... | F16C 17/03 384/309 |
| 8,657,501 B2 * | 2/2014 | Palomba | ............... | F16C 17/03 384/117 |
| 8,834,032 B2 * | 9/2014 | Suzuki | ............... | F16C 17/03 384/311 |
| 9,022,658 B2 * | 5/2015 | Buguin | ............... | F01D 25/166 384/117 |
| 9,366,287 B2 * | 6/2016 | Nishioka | ............... | F16C 32/0659 |
| 2005/0047690 A1 * | 3/2005 | Keramati | ............... | F01D 25/168 384/368 |
| 2009/0080820 A1 * | 3/2009 | Matyscak | ............... | F16C 33/108 384/293 |
| 2014/0169712 A1 * | 6/2014 | Suzuki | ............... | F16C 33/6681 384/289 |
| 2015/0003760 A1 * | 1/2015 | Van Mullem | ............... | F16C 32/0659 384/123 |
| 2015/0159692 A1 * | 6/2015 | Dourlens | ............... | F16C 17/03 384/192 |
| 2016/0169275 A1 * | 6/2016 | Sato | ............... | F16C 33/108 384/117 |

OTHER PUBLICATIONS

Decision to Grant a Patent issued Oct. 4, 2016 in corresponding Japanese Application No. 2014-192545 (with partial English translation).

Written Opinion of the International Search Authority issued Mar. 31, 2015 in corresponding PCT application No. PCT/JP2015/53805 (with English translation).

Notification of Reason for Refusal dated Jun. 1, 2017 in Korean Application No. 10-2015-7036353 (English translation).

* cited by examiner

BEARING AND BEARING PAD

TECHNICAL FIELD

The present invention relates to a bearing that rotatably supports a rotating shaft via a bearing pad and that is supplied with a lubricant oil a space between the bearing pad and the rotating shaft and also relates to the bearing pad.

BACKGROUND

A tilting pad bearing and a thrust pad bearing, each of which configures the bearing surface with multiple independent bearing pads, have an advantage of rapidly absorbing vibration of rotating shafts. Due to this advantage, bearings of these types have been broadly applied to rotating machine, such as a steam turbine and a gas turbine. In recent years, such rotating machine has cherished heightening of the output and lowering of the loss than ever. For this purpose, bearing loss needs to be suppressed by reducing the size of the bearing that bears the rotating shaft of the rotating machine. However, it is sure that a small bearing can suppress bearing loss, but the resultant small pressed area of the bearing increases the bearing load (weight on the bearing per unit area) to raise the temperature of the bearing pads.

While the rotating machine is working, the lubricant oil between the rotating shaft and the pads evolves heat generated by shear force, and each bearing pad, if being a journal bearing, becomes hotter towards the inner surface close to the rotating shaft and becomes also hotter towards the downstream of the rotating direction of the rotating shaft. This means that the bearing pad has an inner temperature difference and would become deformed due to differential expansion (differential thermal expansion). For example, in a tilting pad journal bearing, when each tilting pad becomes hotter at a portion closer to the inner circumference side nearer to the rotating shaft and thereby has an internal temperature difference between the inner circumference side and the outer circumference side, the tilting pad becomes deformed so as to increase the radius of curvature opposing to the rotating shaft, so that the bearing has a degraded capability of dealing with load.

Specifically, the tilting pad journal bearing has tilting pads each of which has an inner circumference surface (supporting surface) opposing to the outer circumference surface (supported surface) of the rotating shaft, and a lubricant oil film is formed at a space between the opposing surfaces. The presence of the lubricant oil film enables the bearing to smoothly support the rotating shaft.

If a tilting pad undergoes thermal deformation to have an increased radius of curvature, the space is widened more than needed at the inlet and exit portions to make it impossible to retain the oil film. For this reason, the oil film is entirely thinner. However, a thin lubricant oil further evolves heat.

Consequently, the temperature of the entire tilting pad is elevated to further deform the tilting pad, and finally, the bearing comes into contact with the rotating shaft (so that the bearing becomes incapable of loading the rotating shaft). Accordingly, the bearing has a degraded capability of dealing with the load.

Furthermore, deformation of a tilting pad affects the dynamic stability of the tilting pad. Namely, the attenuation coefficient lowers and therefore the tilting pad fails to rapidly absorb the vibration of the rotating shaft.

As a solution to the above, there is proposed a technique of forming a conduit penetrating the bearing pad from the front end surface to the rear end surface and cooling the entire bearing pad by a low-temperature additional oil flowing through the conduit (see Japanese Patent Publication No. 2009-063015, hereinafter "JP 2009-063015").

As another solution, there is provided a technique of suppressing deformation caused by internal temperature difference by using material having a high thermal conductivity, such as Chromium copper.

Problem to be Solved by Invention

However, the technique of JP 2009-063015 does not have a significant differential pressure between the front end surface and the rear end surface, and does require a pump to let the low-temperature additional oil flow through the inner conduit, separately from a pump for the lubricant oil supply, which is however not described in JP 2009-063015. In addition, the technique also requires preparation of the low-temperature additional oil separately from the lubricant oil.

Accordingly, the technique of JP 2009-063015 bears an increase in both production costs and running costs.

Since material having a high thermal conductivity is extremely expensive, a technique using such material with a high thermal conductivity for a bearing pad leads to a rise in production cost.

SUMMARY

With the foregoing problems in view, the object of the present invention is to provide a bearing and a bearing pad that are free from an increase in cost and that suppress deformation of the bearing pad.

Means to Solve the Problem (1) To attain the above object, there is provided a bearing that rotatably supports a rotating shaft via one or more bearing pads and that is supplied with a lubricant oil to a space between the bearing pads and a supported surface of the rotating shaft, wherein: at least one of the bearing pads comprises a conduit that extends from a first aperture formed on a high temperature zone of a sliding surface opposing to the supported surface in a direction apart from the supported surface and that reaches a second aperture; each of the bearing pads is tiltable towards a rotating direction of the rotating shaft; the high temperature zone is positioned at a pad rear portion in the downstream region of the sliding surface with respect to the rotating direction of the shaft, and the second aperture is positioned on a pad forward portion upstream of the first aperture with respect to the rotating direction; and the conduit is a flow path having the first aperture as an inlet and the second aperture as an exit and having a differential pressure letting the lubricant oil flowing therethrough.

(2) As another preferable feature, the high temperature zone may lie within a range of 70-100% of a length of the sliding surface from an upstream edge of the sliding surface with respect to the rotating direction.

(3) As an additional preferable feature, the second aperture may be arranged on a back surface that is an opposite side of the sliding surface.

(4) As a further preferable feature, the second aperture may be arranged on a front surface pointing upstream of the rotating direction.

(5) As a still further preferable feature, the supported surface may be a circumference surface along a radius direction of the rotating shaft.

(6) As a still preferable feature, the rotating shaft may include a thrust collar That extends outward in a radius direction of the rotating shaft; and the supported surface may be an end surface of the thrust collar toward an axis direction of the rotating shaft.

(7) To attain the above feature, there is provided a bearing pad that rotatably supports a rotating shaft and that is supplied with a lubricant oil to a space between the bearing pad and a supported surface of the rotating shaft and that is tiltable towards a rotating direction of the rotating shaft, wherein the bearing pad includes a conduit that extends from a first aperture formed on a high temperature zone of a sliding surface opposing to the supported surface in a direction apart from the supported surface and that reaches a second aperture; the high temperature zone is positioned at a pad rear portion in the downstream region of the sliding surface with respect to the rotating direction of the shaft, and the second aperture is positioned on a pad forward portion upstream of the first aperture with respect to the rotating direction; and the conduit is a flow path having the first aperture as an inlet and the second aperture as an exit and having a differential pressure letting the lubricant oil flowing therethrough.

Effects of Invention

According to the present invention, the differential pressure between the first aperture and the second aperture lets the lubricant oil flow through the conduit from the first aperture to the second aperture, which means that the first aperture serves as an inlet and the second aperture serves as an exit.

Specifically, rotation of the rotating shaft compresses and applies shear force to the lubricant oil between the supported surface of the rotating shaft and the sliding surface of the bearing pad opposing to the supported surface and consequently the lubricant oil evolves heat. This makes the lubricant oil near the sliding surface of the bearing pad close to the supported surface be high in temperature and pressure. In particular, as a zone near to a region where the lubricant oil comes to have a high pressure between the sliding surface and the supported surface is regarded as the high temperature zone of the sliding surface, the lubricant oil provided in the first aperture formed on the high temperature zone of the sliding surface is high in temperature and pressure. On the other hand, the lubricant oil at the second aperture at the end of the conduit extending in a direction apart from the supported surface is lower than the first aperture in temperature and pressure, which generates a differential pressure between the first aperture and the second aperture. Accordingly, the differential pressure lets the lubricant oil flow through the conduit from the first aperture to the second aperture.

Since the lubricant oil flowing through the conduit moves heat, which would remain around the first aperture (in the high-temperature zone) if the conduit is absent, towards the second aperture, it is possible to inhibit the temperature of the bearing pad from locally rising and thereby to make the temperature uniform, lowering the highest temperature thereof.

The temperature of the bearing pad is made uniform by using the differential pressure to let the lubricant oil flow through the conduit. This structure can eliminate the requirement of a pump to let the lubricant oil flow through the conduit, also the requirement for using an additional oil for cooling in addition to the lubricant oil, and the requirement for using material having a high thermal conductivity as the material for the bearing pad.

Accordingly, the bearing pad can be avoided from being deformed without rising costs.

Since the bearing pad is tiltable towards a rotating direction of the rotating shaft and also the second aperture is positioned on a pad forward portion upstream of the first aperture with respect to the rotating direction, the temperature of the bearing pad can be widely made uniform.

Namely, while the rotating shaft is rotating, the bearing pad tilts to have a wider space between the bearing pad and the rotating shaft at a pad forward portion upstream along the rotating direction of the rotating shaft and a narrower space between the bearing pad and the rotating shaft at a pad rear portion downstream along the rotating direction of the rotating shaft. This tilting orientation rises the pressure of the lubricant oil between the rotating shaft and the bearing pad as approaching downstream of the rotating direction, which accompanies a rise in temperature of the lubricant oil as approaching downstream along the rotating direction.

Accordingly, forming the second aperture at the pad forward portion upstream of the first aperture with respect to the rotating direction forms the exit (second aperture) of the conduit at a lower temperature portion of the bearing pad, so that the temperature of a wide range of the bearing pad can be made uniform.

In cases where the second aperture is arranged on the back surface opposite to the sliding surface, it is possible to prevent the hot lubricant oil exhausted from the second aperture, that is, the exit of the conduit, from reflowing into the opposite sliding surface. This can further suppress a rise in the temperature of the bearing pad.

In cases where the second aperture is arranged on a front surface pointing upstream of the rotating direction, the conduit is formed at a wider range across the bearing pad, so that the region in which the temperature is made uniform can be widened.

BRIEF DESCRIPTION OF DRAWING

FIGS. 2A and 2B are schematic diagrams illustrating the structure of a tilting pad journal bearing of the first embodiment of the present invention along with the effects and advantages of the first embodiment.

FIGS. 3A and 3B are schematic diagrams illustrating the structure of a tilting pad journal bearing of a second embodiment of the present invention along with the effects and advantages of the second embodiment.

FIGS. 4A and 4B are schematic diagrams illustrating the entire structure of a tilting pad thrust bearing according to a third embodiment of the present invention.

EMBODIMENT(S) TO CARRY OUT INVENTION

Hereinafter, embodiments of the present invention will now be described with reference to the accompanying drawings. The following embodiments are merely exemplary and there is no intention to exclude modification and application of another technique that are not described in the following examples. The following embodiments can be variously modified without departing from the purposes thereof.

1. First Embodiment

Description will now be made in relation to a tilting pad journal bearing and a bearing pad for a journal bearing according to the first embodiment of the present invention by referring to FIGS. 1-3B.

Figure 1:
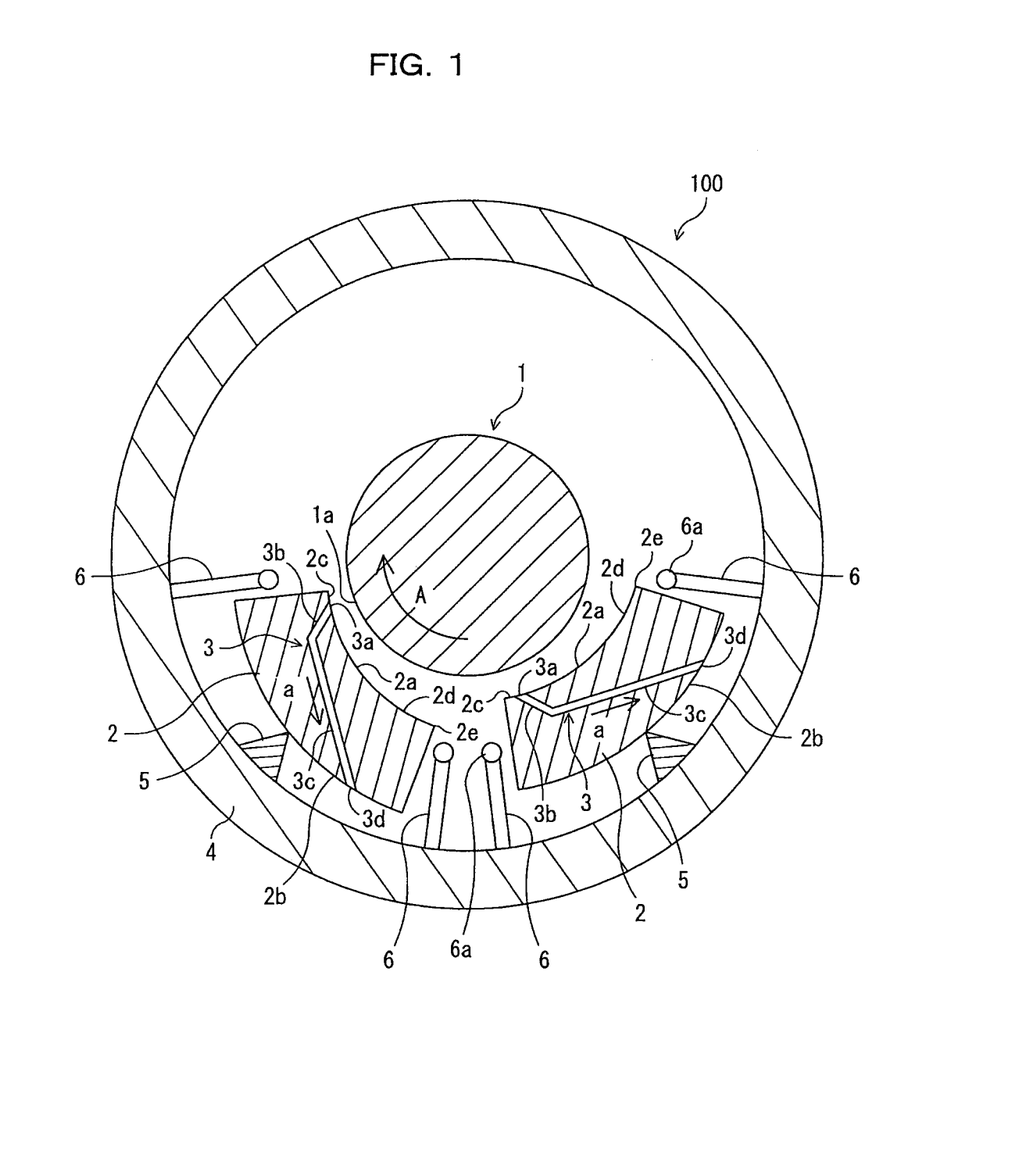
FIG. 1 is a schematic diagram illustrating the tilting pad journal bearing according to a first embodiment of the present invention and specifically is a sectional view (cross sectional view) of the bearing cut perpendicularly to the axis line of the rotating shaft.

1-1. Entire Structure of Tilting Pad Journal Bearing:

As illustrated in FIG. 1, a bearing 100 of the first embodiment of the present invention is configured to be a journal bearing that rotatably supports a rotating shaft 1, which rotates in the direction of arrow A (hereinafter the direction is also called the rotating direction), from the radius direction.

Specifically, the bearing 100 includes multiple (two in this example) tilting pads (bearing pad of the first embodiment) 2 that support the rotating shaft 1 in the vertically upward direction, a bearing housing 4 arranged around the rotating shaft 1 and the tilting pads 2, and oil supply nozzles 6 that each sprays lubricant oil from the ejector 6a disposed at the tip of the nozzle 6. On the inner circumference surface of the bearing housing 4, multiple (two in this example) pivots 5 are installed, which swingably support the respective tilting pads 2.

Two oil supply nozzles 6 are provided for each tilting pad 2. Specifically, one oil supply nozzle 6 is arranged at the forward portion (i.e., an upstream portion of the rotating direction A of the rotating shaft 1) and the other is arranged at the backward portion (i.e., a downstream portion of the rotating direction A of the rotating shaft 1). The additional lubricant oil sprayed from the ejectors 6a of the respective oil supply nozzles 6 forms an oil film between the circumference surface (supported surface, hereinafter also called a rotating shaft circumference surface) 1a of the rotating shaft 1 and a sliding surface (hereinafter also called a pad sliding surface) 2a of a tilting pad 2 opposing to the rotating shaft circumference surface 1a.

1-2. Structure of Tilting Pad of Journal Bearing:

In the tilting pad 2, which is the main part of the present invention, a conduit 3 is formed so as to connect a first aperture (hereinafter also called aperture or inlet) 3a formed on the sliding surface 2a to a second aperture (hereinafter also called aperture or exit) 3d formed on the back surface (surface on the opposite side of the sliding surface 2a and opposing to the bearing housing 4) 3d. In the first embodiment, the conduit 3 is divided into two parts of a path 3b towards the sliding surface 2a and a path 3c towards the back surface 2b that have different angles and therefor the conduit 3 bends.

Here, rotation of the rotating shaft 1 compresses and applies shear force generated by the sliding to the lubricant oil between the rotating shaft circumference surface 1a and the pad sliding surface 2a opposing to the rotating shaft circumference surface 1a and consequently the lubricant oil evolves heat. This makes the lubricant oil near to the sliding surface 2a close to the rotating shaft circumference surface 1a be high in both pressure and temperature, and above all, the lubricant oil comes to be the highest in both pressure and temperature at a zone (hereinafter called high temperature portion) 2H corresponding to a pad rear portion 2c as to be detailed below (see FIGS. 2A and 2B). The pressure of the lubricant oil in proximity to the zone 2H depends on the specification of the bearing and comes to be as high as, for example, 20 Mpa (200 atmospheres).

The first aperture 3a of the conduit 3 is arranged within the high temperature zone 2H that is also a high pressure zone while the second aperture 3d of the conduit 3 is arranged on the pad back surface 2b. The lubricant oil near the second aperture 3d on the pad back surface 2b is lower in temperature and pressure than that near the first aperture 3a (than the lubricant oil in the state of being pressurized and evolving heat between circumference surface 1a and sliding surface 2a) and has a pressure close to atmospheric pressure.

Accordingly, the oil pressure near the first aperture 3a on the sliding surface 2a has a large differential pressure from the oil pressure near the second aperture 3d on the pad back surface 2b. This differential pressure lets the lubricant oil spontaneously flow through the conduit 3 in the direction of the arrow a from the first aperture 3a as the inlet to the second aperture 3d as the exit. This means that the conduit 3 functions as an oil extraction hole.

Figure 2A:
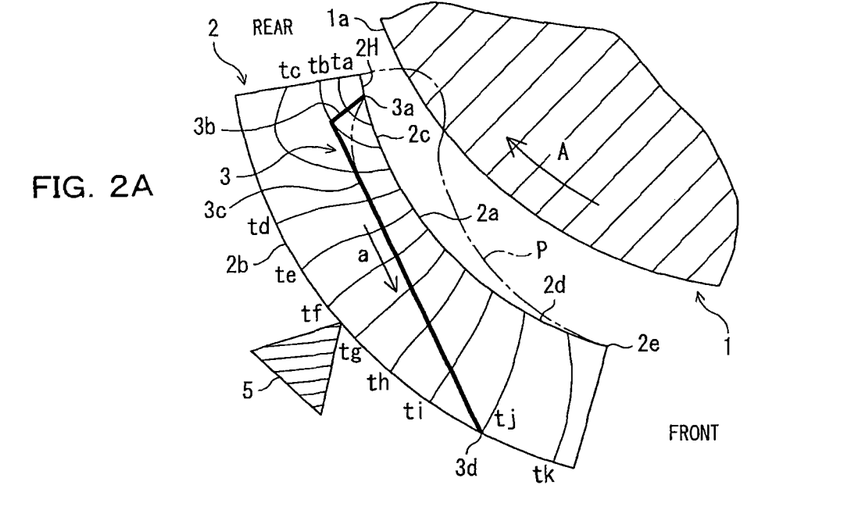
FIG. 2A being a cross sectional diagram (omitting hatching to show the section of the tilting pad) along with the temperature distribution and the oil-film pressure distribution of the tilting pad, and FIG. 2B being a perspective view along with the temperature distribution of the tilting pad.
Figure 2B:
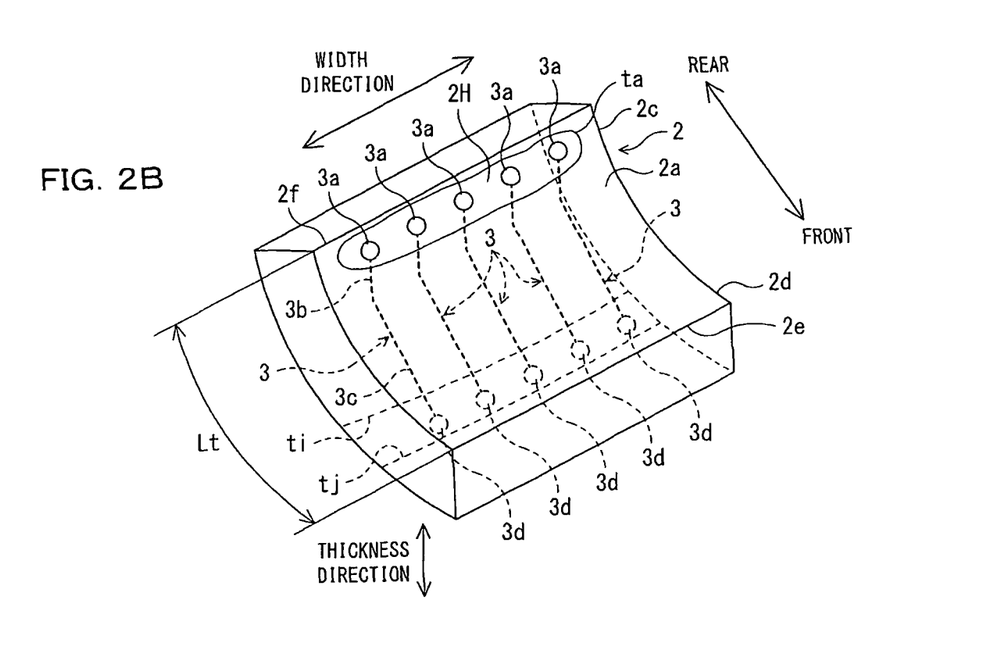

The conduit 3 will now be further detailed by referring to FIGS. 2A and 2B. Multiple lines appearing on the tilting pad 2 in FIGS. 2A and 2B are isotherms that connect points having respective temperatures ta to tk attached to the respective lines when the tilting pad 2 is assumed not to have the conduit 3 (FIG. 2B illustrates only an isotherm of the temperature ta on the sliding surface 2a and isotherms of the temperatures ti and tj on the pad back surface 2b). The temperatures ta to tk represent higher temperatures in the descending order. Namely, among the temperatures ta to tk, the temperature ta is the highest while the temperature tk is the lowest. As understood from the drawings, in cases where the conduit 3 is not formed, a high temperature zone (here, a zone surrounded by the isotherm of temperature ta and having a temperature ta or higher) 2H including a point having the highest temperature lies at the pad rear portion (i.e., downstream direction along the rotating direction) 2c on the sliding surface 2a.

The high temperature zone 2H lies at the pad rear portion 2c of the sliding surface 2a as the above description for the following reasons.

The lubricant oil (lubricant oil film) being pressurized between the rotating shaft circumference surface 1a and the tilting pad 2 has an oil pressure (hereinafter also called oil film pressure) much higher than the oil pressure on the pad back surface 2b as described above, and above all has a particularly high oil film pressure at the pad rear portion 2c. As illustrated in FIG. 2A, the orientation of the tilting pad 2 keeps its balance in the state of tilting (namely, the tilting pad 2 comes closer to the circumference surface 1a at the pad rear portion 2c, that is the downstream portion with respect to the rotating direction A, while comes apart from the circumference surface 1a at a pad forward portion 2d, that is the upstream portion with respect to the rotating direction A). The one-dotted line in FIG. 2A represents the oil film pressure P, which comes to be the minimum in the vicinity of the atmospheric pressure at the inlet (front edge) and the exit (rear edge) and comes to be the maximum at the pad rear portion 2c, where the space between the circumference surface 1a and the sliding surface 2a is narrow to make the oil film thin.

Since a higher oil film pressure P increases an amount of heat that the lubricant oil film evolves, the temperature of the lubricant oil film and the temperature of the tilting pad 2 which are assumed not to form the conduit 3 therein have a high temperature zone 2H at the pad rear portion 2c of the sliding surface 2a.

It has been revealed, through practice, experiment, and simulation, that the maximum value of the oil film pressure P lies within a range of 70-90% of the length Lt (see FIG. 2B) from the upstream edge 2e to the downstream edge 2g. The temperature of the sliding surface 2a rises as the oil film pressure P rises, and the highest temperature on the sliding surface 2a is expected to lie within a range of 70-100% of the length Lt from the upstream edge 2e. Accordingly, it is satisfactory that the high temperature zone 2H is in the range of 70-100% of the length Lt of the sliding surface 2a and the inlet 3a is formed in this range. Alternatively, the high temperature zone 2H may be determined by estimating, through experiment or simulation, a zone having a high possibility of including the highest temperature portion for each bearing and the inlet 3a may be set within the estimated high temperature zone 2H. Otherwise, a point having the highest temperature may be estimated through experiment or simulation and the inlet 3a of the conduit 3 may be set at this estimated point.

As illustrated in FIG. 2B, multiple conduits 3 are arranged across the width direction (hereinafter called pad width direction) of the tilting pad 2 so as to cover substantially entire position of high temperature zone 2H spreading across the pad width direction.

As described above, the conduit 3 consists of the paths 3b, 3c having different angles. Specifically, the upstream path 3b, which passes through the high temperature zone 2H extends in a direction substantially along the thickness direction (hereinafter also called pad thickness direction) of the tilting pad 2 while the downstream path 3c extends in a direction substantially along the front-rear direction (hereinafter also called pad front-rear direction) of the tilting pad 2.

This is because the tilting pad 2 has a temperature distribution that lowers in a direction substantially along the pad thickness direction around the high temperature zone 2H and lowers in a direction substantially along the pad front-rear direction in the remaining zone, and therefore the conduit 3 is formed to let the lubricant oil flow to conform such a temperature distribution. Namely, since lubricant oil, which carries heat, moves from a higher-temperature side to a lower-temperature side by the path 3b around the high temperature zone 2H and by the path 3c around the remaining zone, so that the temperature of the tilting pad 2 can be efficiently made uniform. If the conduit 3 is formed into a straight line connecting the inlet 3a to the exit 3b, the conduit 3 at the high temperature zone 2H lies in a shallow position from the sliding surface 2a. This structure has a possibility of lowering the strength of the tilting pad 2 at the high temperature side, which requires further rigidness. The conduit 3 is bent also to avoid this inconvenience.

If the tilting pad 2 can ensure the rigidness at the high temperature side, the conduit 3 may be formed into a straight line connecting the inlet 3a to the exit 3b. The conduit 3 having a bent structure requires two processes of drilling from the inlet 3a and drilling from the exit 3d. In contrast, forming the straight-line conduit 3 can be completed through a single process of drilling from either the inlet 3a or the exit 3d.

Alternatively, as illustrated by the two-dotted line in FIG. 2A, the paths 3b, 3c may be formed to have a curved connection therebetween. Also in this case, using a bendable drilling rod electrode makes it possible to form a curved conduit in a single process of drilling from either the inlet 3a or the exit 3d.

An excessively large diameter of the conduit 3 may affect formation of the oil film pressure between the pad sliding surface 2a and the circumference surface 1a, and therefore a preferable diameter of the conduit 3 is equal to or less than 5% of the size of the pad width.

1-3. Effects and Advantages:

Hereinafter, description will now be made in relation to the effects and advantages of the journal bearing and the tilting pad according to the first embodiment.

The conduit 3 has the inlet 3a arranged within the high temperature zone 2H that is also a high pressure zone and the exit 3d is opened to the pad back surface 2b of the low temperature zone that is a low pressure zone having the substantially atmospheric pressure. The conduit 3 consequently has a large differential pressure between the inlet 3a and the exit 3d to let the lubricant oil spontaneously flow through time conduit 3 in the direction of the arrow a. At that time, the flowing lubricant oil moves heat in the high temperature zone 2H to the low temperature side.

The presence of the conduit 3 lowers the temperature at the pad rear portion 2c accommodating the high temperature zone 2H of the tilting pad 2 and also raises the temperature at the pad forward portion 2d lower in temperature than the pad rear portion 2c so that the temperature of the tilting pad 2 is made uniform as compared with a tilting pad not having a conduit 3. Consequently, the tilting pad 2 can be escaped from locally having a high temperature portion and the highest temperature can be lowered. This can suppress thermal deformation accompanied by differential thermal expansion and therefore can eliminate the requirement of using expensive material having a high terminal conductivity for the bearing pad.

Furthermore, the differential pressure is used to let the lubricant oil flow through the conduit 3 to make the temperature of the tilting pad 2 uniform. This structure can eliminate the requirement for a pump to let the lubricant oil flow through the conduit 3. Furthermore, letting the lubricant oil flow through the conduit 3 avoids locally raising the temperature of the tilting pad 2 and also lowers the highest temperature of the tilting pad 2. This structure can eliminate the requirement to prepare a low-temperature additional oil for the purpose of cooling in addition to the lubricant oil.

Accordingly, it is possible to inhibit the bearing pad from being deformed without increasing costs.

The above advantages can be easily accomplished by simply forming conduits in a tilting pad.

When the rotating shaft 1 vibrates, a tilting pad having a larger spring constant bounces the rotating shaft 1 and makes it difficult to absorb the vibration. In contrast, a tilting pad having a larger attenuation coefficient more absorbs the vibration of the rotating shaft 1 to cease the vibration more rapidly. Inhibiting deformation of the tilting pad 2 can keep the attenuation coefficient to be high as compared with a traditional tilting pad not being inhibited from being deformed but even having an equivalent sprint constant.

Multiple conduits 3 arranged across the pad width direction bring an advantage of making the temperature of the entire tilting pad 2 uniform.

Since the exit 3d of the conduit 3 is formed on the pad back surface 2b, the hot lubricant oil heated by the friction loss between the rotating shaft circumference surface 1a and the sliding surface 2a does not re-flow onto the sliding surface 2a after passing through the exit 3d. In addition, since the hot lubricant oil does not re-flow onto the sliding surface 2a, the low-temperature additional lubricant oil (additional oil) supplied from each oil supply nozzle 6 is not inhibited from flowing into the sliding surface 2a. Accordingly, rising the temperature of the rotating shaft 1 and the tilting pad 2 can be advantageously avoided.

2. Second Embodiment

Description will now be made in relation to a bearing and a bearing pad according to a second embodiment of the present invention by referring to FIGS. 3A and 3B. Like reference numbers designate same parts or elements between the first and second embodiments, so repetitious description is omitted here.

2-1. structure of tilting pad journal bearing and structure of tilting pad for journal bearing: In place of the tilting pads 2 of the bearing 100 of the first embodiment, the bearing device according to the second embodiment of the present invention uses tilting pads (bearing pads according to the second embodiment of the present invention) 2A illustrated in FIGS. 3A and 3B in the bearing of the first embodiment.

The tilting pad 2A of the second embodiment is different from the tilting pad 2 of the first embodiment in the point that the tilting pad 2A arranges the exit 3d of the conduit 3A on the front surface (hereinafter called tilting pad front surface) 2g of the tilting pad 2A pointing towards the upstream of rotating direction A while the tilting pad 2 of the first embodiment arranges the exit 3d of the conduit 3 on the pad back surface 2b.

The structure of the conduit 3A will now be further detailed by comparing the conduit 3 of the first embodiment. The path 3b from the inlet 3a (the pad sliding surface 2a side) of the conduit 3A is the same as the first embodiment, but the path 3c to the exit 3d lies shallower than the path 3c of the first embodiment (in other words, the path 3c of the second embodiment runs more parallel with the front-rear direction of the pad). Accordingly, this arranges the exit 3d of the end of the path 3c on the front surface 2g, not on the pad back surface 2b.

Figure 3A:
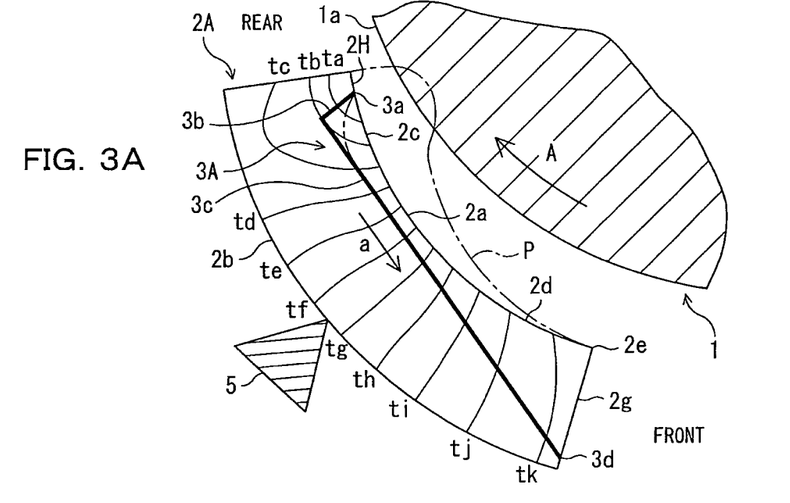
FIG. 3A being a cross sectional diagram (omitting hatching to show the section of the tilting pad) along with the temperature distribution and the oil-film pressure distribution of the tilting pad, and FIG. 3B being a perspective view along with the temperature distribution of the tilting pad.
Figure 3B:
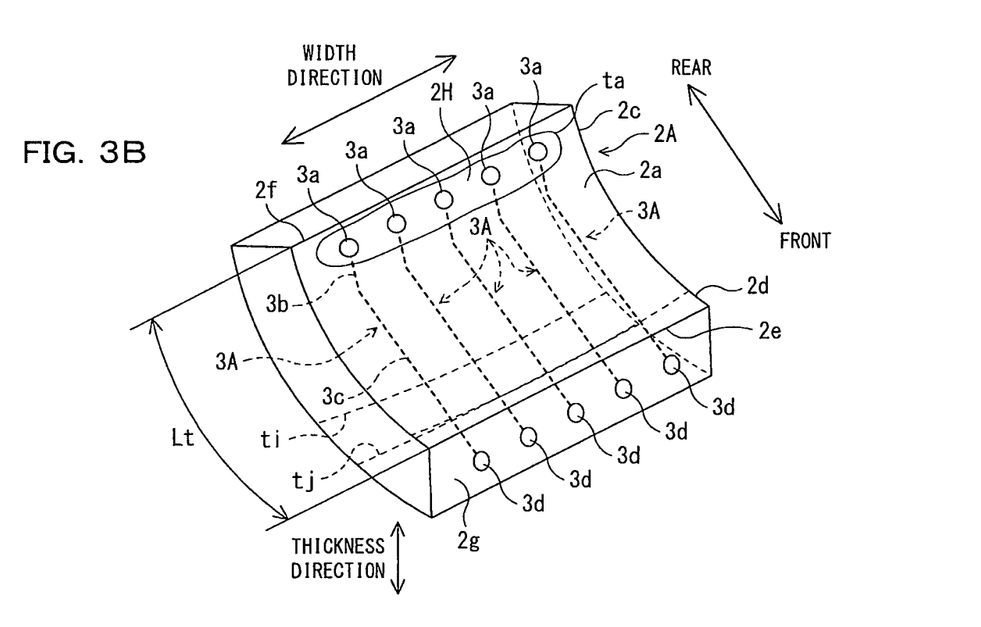

Likewise the conduit 3 of the first embodiment, the conduit 3A may take a form of a straight line that connects the inlet 3a to the exit 3d if the structure rigidness permits, and further alternatively, the conduit 3A may have a curved connection between the paths 3b and 3c as illustrated by the two-dotted line in FIG. 3A.

2-2. Effects and Advantages:

The journal bearing and the tilting pad 2A of the second embodiment arranges the exit 3d of the conduit 3A on the pad front surface 2g around which the oil pressure is in the same extent as the atmospheric pressure. This structure allows the hot lubricant oil to spontaneously flow from the inlet 3a high in temperature, and pressure to the exit 3d low in temperature and pressure, so that the same effects and advantages as the first embodiment can be obtained.

In addition, the exit 3d of the conduit 3A is arranged on the pad front surface 2g, which can widen the area of the tilting pad through which the conduit passes as compared with the structure in which the exit 3d is arranged on the pad back surface 2b. This makes the temperature of the tilting pad 2A uniform over the wider area.

3. Third Embodiment

Description will now be made in relation to the bearing and the bearing pad according to a third embodiment of the present invention by referring to FIGS. 4A, 4B, 5A, and 5B. Like reference numbers designate same parts or elements throughout the first to the third embodiments, so repetitious description is omitted here.

Figure 4A:
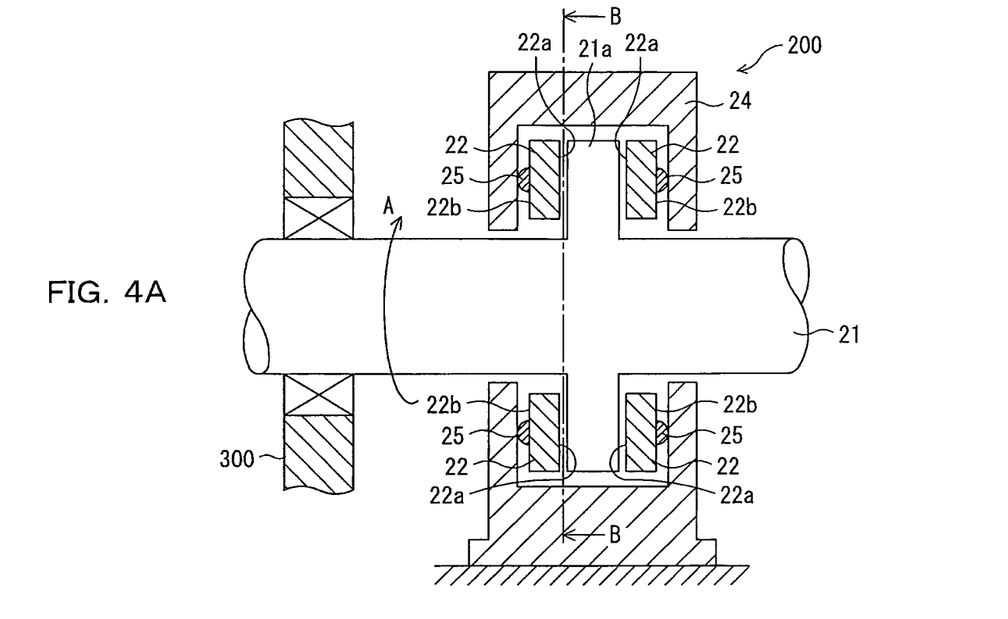
FIG. 4A being a cutaway side view, and FIG. 4B being a sectional view of FIG. 4A taken along line B-B.
Figure 4B:
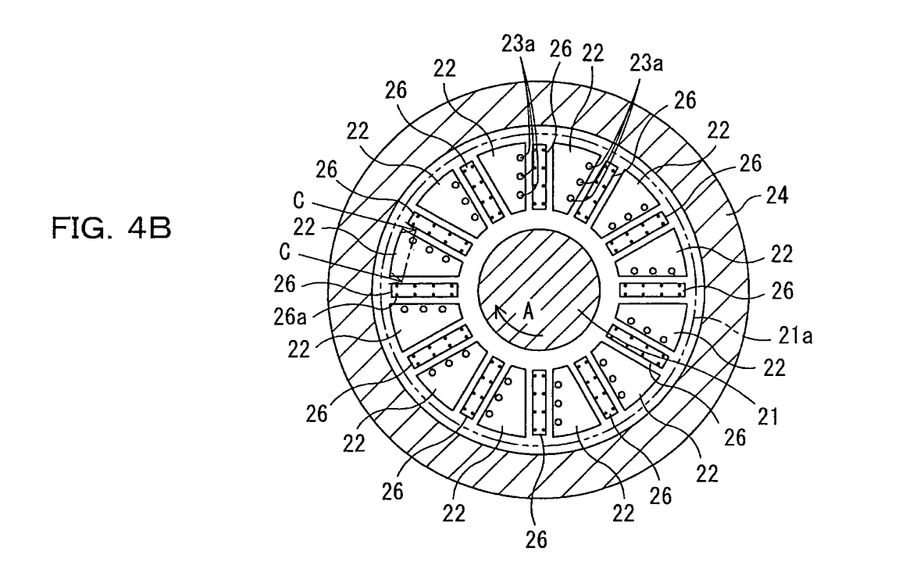

3-1. Entire Structure of Tilting Pad Thrust Bearing:

As illustrated in FIGS. 4A and 4B, a bearing 200 of the third embodiment takes a form of a thrust bearing that supports a rotating shaft 21 that rotates in the direction (hereinafter called rotating direction) indicated by the arrow A from the axis direction of the rotating shaft 21.

Specifically, the bearing 200 includes tilting pads (bearing pads of the third embodiment of the present invention) 22 that rotatably support a thrust collar (supported portion) 21a in the form of a flange portion of the rotating shaft 21 from the axis direction of the rotating shaft 21, a bearing housing 24 arranged around the rotating shaft 21 and tilting pads 22, and oil supply nozzles 26 that spray lubricant oil from the respective ejectors 26a at the tips of the nozzles.

The tilting pads 22 are arranged on the both sides of the thrust collar 21a along the axis direction. Specifically, multiple (in this example, twelve) tilting pads 22 are arranged around the entire circumference of each side of the thrust collar (supported portion) 21a. On the back surface (hereinafter also called pad back surface) 22b of the each tilting pad 22, a pivot 25 is arranged to make the tilting pad 2 swingably.

The oil supply nozzles 26 are alternately arranged with the tilting pads 22 and spray the lubricant oil (additional oil) from the ejectors 26a thereof to form an oil film between the thrust collar 21a serving as the supported portion and the sliding surfaces (hereinafter also called pad sliding surfaces) 22a of the tilting pads 22 opposing to the thrust collar 21a.

The rotating shaft 21 is also supported by a journal bearing 300 as well as by the thrust bearing 200.

The bearing housing 24 further includes one or more non-illustrated exhausting holes through which old lubricant oil is successively drained out in place of the additional oil fed from the oil supply nozzles 26.

Figure 5A:
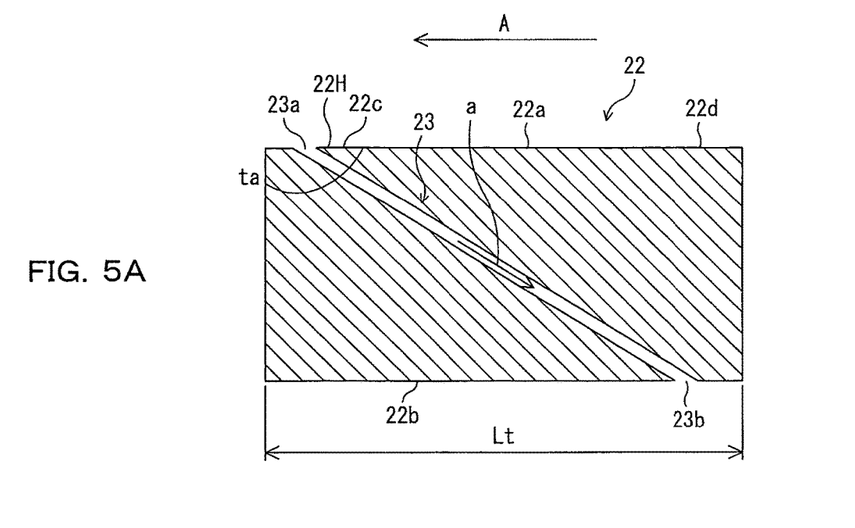
FIGS. 5A and 5B are schematic diagram illustrating the structure of a tilting pad thrust bearing of the third embodiment, FIG. 5A being a sectional view of FIG. 4B taken along line C-C, and FIG. 5B being a perspective view of the tilting pad.
Figure 5B:
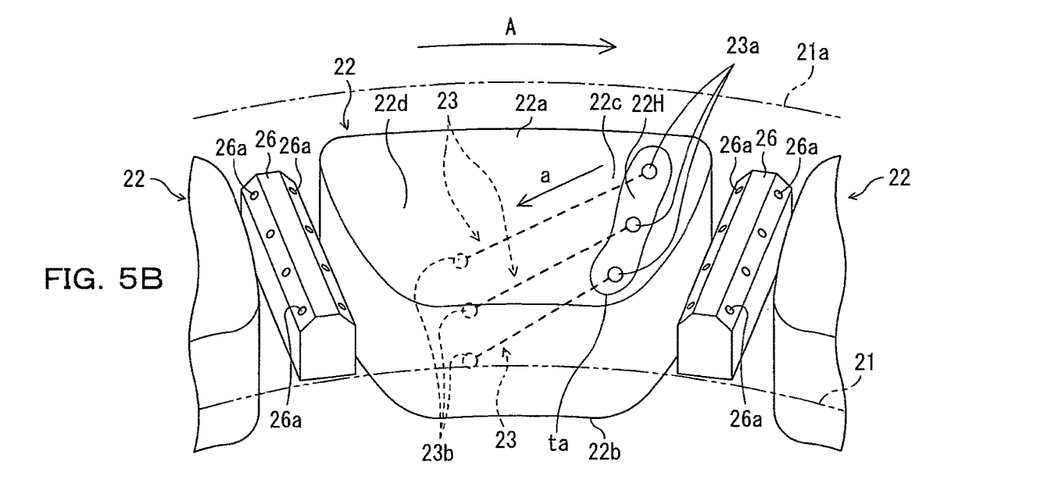

3-2. Structure of Tilting Pad for Thrust Bearing:

As illustrated in FIGS. 5A and 5B, each tilting pad 22 includes a conduit 23 that runs from a first aperture (hereinafter also called aperture or inlet) 23a formed on the sliding surface 22a to a second aperture (hereinafter called aperture or exit) 23b formed on the back surface 22b. The conduit 23 here is formed into a straight line connecting the inlet 23a to the exit 23b.

The inlet 23a is formed on a high-temperature zone 23H located in the rear portion (downstream portion of the rotating direction A) 22c on the pad sliding surface 22a while the exit 23b is formed in the forward portion (upstream portion of the rotating direction A) 22d on the pad back surface 22b.

Since the high temperature zone 22H lies at a portion of the sliding surface 22a within a range of 70-100% of the length Lt of the sliding surface 22a from the upstream edge for the same reason as that described in the first embodiment, the inlet 3a is formed in this range.

As illustrated in FIG. 5B, since the high temperature zone 22H having the highest temperature spreads across the width direction of the pad, multiple conduits 23 are arranged across the pad width direction at intervals so as to cover the high temperature zone 22H.

3-3. Effects and Advantages:

The above structure of the tilting pad thrust bearing of the third embodiment of the present invention ensures the effects and advantages the same as the first embodiment.

4. Fourth Embodiment

Figure 6A:
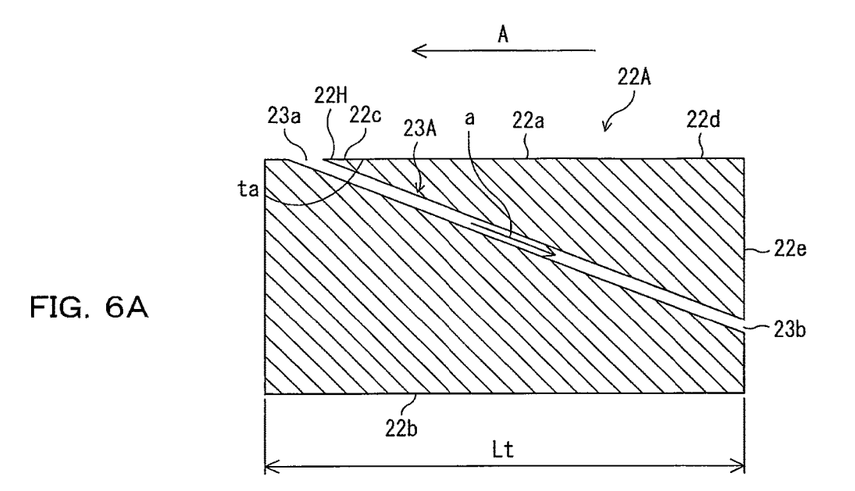
FIGS. 6A and 6B are schematic diagram illustrating the structure of a tilting pad thrust bearing of the fourth embodiment, FIG. 6A being a diagram corresponding to a sectional view of FIG. 4B taken along line C-C, and FIG. 6B being a perspective view of the tilting pad.
Figure 6B:
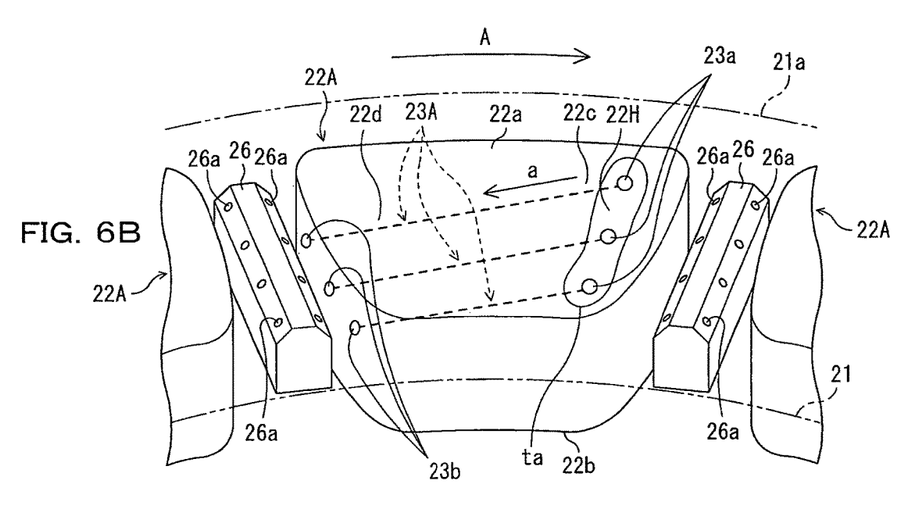

Here, description will now be made in relation to the tilting pad thrust bearing and the tilting pad for a tilting pad thrust bearing according to a fourth embodiment of the present invention by referring to FIGS. 4A, 6A, and 6B. Like reference numbers designate same parts or elements between the third and fourth embodiments, so repetitious description is omitted here.

4-1. Structure:

The bearing according to the fourth embodiment takes a form of a thrust bearing as illustrated in FIG. 4A likewise the third embodiment. The fourth embodiment is different from that of the third embodiment only in the point of the structure of tilting pad (bearing pad of the fourth embodiment of the present invention) 22A.

Hereinafter, the structure of the tilting pad 22A will now be described by referring to FIGS. 6A and 6B. The tilting pad 22A of this embodiment has an exit 23b of the conduit 23A formed at the front surface 22e of the tilting pad 22A while the exit 23b of the conduit 23 of the third embodiment is formed on the pad back surface 22b. The conduit 23A of the fourth embodiment takes the form of a straight line connecting the inlet 23a to the exit 23b.

4-2. Effects and Advantages:

The above structure of the tilting pad thrust bearing of the fourth embodiment of the present invention ensures the effects and advantages the same as the second embodiment.

5. Others

In the foregoing first and second embodiment, the tilting pads 2, 2A are arranged only below the rotating shaft 1. Alternatively, the tilting pads 2, 2A may be arranged around the entire circumference of the rotating shaft 1 including the upper side of the rotating shaft 1. In cases where the tilting pads 2, 2A are arranged around the entire circumference of the rotating shaft 1, there is no requirement to form the conduits 3, 3A in all the tilting pads 2, 2A, but it is satisfactory to form the conduits 3, 3A in at least lower tilting pads 2, 2A that are highly loaded.

The conduits 23, 23A of the third and fourth embodiments each takes a form of straight lines. Alternatively, the conduits 23, 23A may be bent or curved to conform the inner temperature distribution of the tilting pads as carried out in the first and the second embodiments.

The foregoing embodiments regard the range of 70-100% of the length Lt from the frond edge of the pad sliding surface to be the high temperature zone. However, the high temperature zone is not limited to this. Alternatively, the downstream portion (i.e., within a range of 50% or more of the length Lt from the front edge of the pad sliding surface) in the rotating direction of the pad sliding surface may be regarded as the high temperature zone. Besides, the foregoing embodiments arrange the exits (second apertures) upstream of the respective inlets (first apertures) in the rotating direction of the rotating shaft. However, the arrangement of the first and second apertures is not limited to this. Alternatively, the exit of the conduit may be arranged at the same position as the inlet with respect to the rotating direction of the rotating shaft.

The bearing of the present invention provides a conduit passing through the high temperature zone and a zone of lower temperature than that of the high temperature zone in a bearing pad, so that the heat that would remain in the high-temperature zone if the conduit is absent is moved to the other zone to lower the highest temperature of the bearing pad to finally make the temperature in the bearing pad uniform. From this viewpoint, any zone that can let the lubricant oil flow through the conduit by using differential pressure and is relatively higher in temperature than the remaining zone through which the conduit passes (i.e., a zone peripheral to the conduit) can be regarded as the high temperature zone in which the inlet of the conduit is formed.

DESCRIPTION OF REFERENCE NUMBERS

1, 21 rotating shaft
1a circumference surface (supported surface)
2, 2A, 22, 22A tilting pad (bearing pad)
2a, 22a sliding surface
2b, 22b back surface
2c, 22c pad rear portion
2d, 22d pad forward portion
2g, 22e pad front surface
2H, 22H high temperature zone
3, 3A, 23, 23A conduit
3a, 23a inlet (first aperture)
3d, 23b exit (second aperture)
21a thrust collar (supported surface)
100 journal bearing
200 thrust bearing
Lt length of the sliding surface

What is claimed is:

1. A bearing that rotatably supports a rotating shaft via at least two bearing pads and that is configured to be supplied with a lubricant oil to a space between at least two of the bearing pads and a supported surface of the rotating shaft, wherein:

each of the at least two bearing pads is tiltable towards the rotating shaft, a first one of the at least two bearing pads comprises a mechanical pivot that supports the first of the at least two bearing pads and that is in contact with the first of the at least two bearing pads;

a second one of the at least two bearing pads comprises a mechanical pivot that supports the second of the at least two bearing pads and that is in contact with the second of the at least two bearing pads;

one of the at least two bearing pads comprises a conduit that extends from a first aperture defined in a zone of a sliding surface opposite to the supported surface in a direction apart from the supported surface and that reaches a second aperture;

the zone is positioned at a pad rear portion in a downstream region of the sliding surface with respect to a rotating direction of the rotating shaft, and the second aperture is positioned on a pad forward portion upstream of the first aperture with respect to the rotating direction of the rotating shaft;

the conduit is a flow path having the first aperture as an inlet and the second aperture as an exit, the conduit extending from the sliding surface towards an upstream side in the rotating direction of the rotating shaft and having a differential pressure so as to let the lubricant oil flow therethrough; and the second aperture is located at a position apart from the mechanical pivot that supports the one of the at least two bearing pads, wherein the second aperture is arranged on a front surface pointing upstream of the rotating direction of the rotating shaft.

2. The bearing according to claim 1, wherein the zone lies within a range of 70-100% of a length of the sliding surface from an upstream edge of the sliding surface with respect to the rotating direction of the rotating shaft.

3. The bearing according to claim 2, wherein the supported surface is a circumference surface along a radius direction of the rotating shaft.

4. The bearing according to claim 2, wherein: the rotating shaft comprises a thrust collar that extends outward in a radius direction of the rotating shaft; and the supported surface is an end surface of the thrust collar towards an axis direction of the rotating shaft.

5. The bearing according to claim 1, wherein the supported surface is a circumference surface along a radius direction of the rotating shaft.

6. The bearing according to claim 1, wherein:
the rotating shaft comprises a thrust collar that extends outward in a radius direction of the rotating shaft; and
the supported surface is an end surface of the thrust collar towards an axis direction of the rotating shaft.

7. A bearing that rotatably supports a rotating shaft via one or more bearing pads and that is configured to be supplied with a lubricant oil to a space between the one or more bearing pads and a supported surface of the rotating shaft, wherein:
each of the one or more bearing pads is tiltable towards the rotating shaft;
at least one of the one or more bearing pads comprises a conduit that extends from a first aperture defined in a zone of a sliding surface opposite to the supported surface in a direction apart from the supported surface and that reaches a second aperture, and a mechanical pivot that supports the at least one of the one or more bearing pads and that is in contact with the at least one of the one or more bearing pads;
the zone is positioned at a pad rear portion in a downstream region of the sliding surface with respect to a rotating direction of the rotating shaft, and the second aperture is positioned on a pad forward portion upstream of the first aperture with respect to the rotating direction of the rotating shaft;
the conduit is a flow path having the first aperture as an inlet and the second aperture as an exit, the conduit extending from the sliding surface towards an upstream side in the rotating direction of the rotating shaft, and having a differential pressure so as to let the lubricant oil flow therethrough; and
the first aperture is disposed downstream of the mechanical pivot in the rotating direction of the rotating shaft and the second aperture is disposed upstream of the mechanical pivot in the rotating direction of the rotating shaft.

8. The bearing according to claim 7, wherein the zone lies within a range of 70-100% of a length of the sliding surface from an upstream edge of the sliding surface with respect to the rotating direction of the rotating shaft.

9. The bearing according to claim 8, wherein the second aperture is arranged on a back surface that is an opposite side of the sliding surface.

10. The bearing according to claim 8, wherein the second aperture is arranged on a front surface pointing upstream of the rotating direction of the rotating shaft.

11. The bearing according to claim 8, wherein the supported surface is a circumference surface along a radius direction of the rotating shaft.

12. The bearing according to claim 8, wherein:
the rotating shaft comprises a thrust collar that extends outward in a radius direction of the rotating shaft; and
the supported surface is an end surface of the thrust collar towards an axis direction of the rotating shaft.

13. The bearing according to claim 7, wherein the second aperture is arranged on a back surface that is an opposite side of the sliding surface.

14. The bearing according to claim 7, wherein the second aperture is arranged on a front surface pointing upstream of the rotating direction of the rotating shaft.

15. The bearing according to claim 7, wherein the supported surface is a circumference surface along a radius direction of the rotating shaft.

16. The bearing according to claim 7, wherein:
the rotating shaft comprises a thrust collar that extends outward in a radius direction of the rotating shaft; and
the supported surface is an end surface of the thrust collar towards an axis direction of the rotating shaft.

17. A bearing pad that rotatably supports a rotating shaft and that is configured to be supplied with a lubricant oil to a space between the bearing pad and a supported surface of the rotating shaft, wherein:
the bearing pad is tiltable towards the rotation shaft;
the bearing pad comprises a conduit that extends from a first aperture defined in a zone of a sliding surface opposite to the supported surface in a direction apart from the supported surface and that reaches a second aperture, and a mechanical pivot that supports the bearing pad and that is in contact with the bearing pad;
the zone is positioned at a pad rear portion in a downstream region of the sliding surface with respect to a rotating direction of the rotating shaft, and the second aperture is positioned on a pad forward portion upstream of the first aperture with respect to the rotating direction of the rotating shaft;
the conduit is a flow path having the first aperture as an inlet and the second aperture as an exit, the conduit extending from the sliding surface towards an upstream side in the rotating direction of the rotating shaft and having a differential pressure so as to let the lubricant oil flow therethrough; and
the first aperture is disposed downstream of the mechanical pivot in the rotating direction of the rotating shaft and the second aperture is disposed upstream of the mechanical pivot in the rotating direction of the rotating shaft.

* * * * *